United States Patent [19]

Kumazawa

[11] Patent Number: 4,533,451
[45] Date of Patent: Aug. 6, 1985

[54] ELECTROLYZED WATER PRODUCING APPARATUS

[75] Inventor: Eiji Kumazawa, Tokyo, Japan

[73] Assignee: Kabushiki Kaisha Kogai Boshi Sogo Kenkyusho, Tokyo, Japan

[21] Appl. No.: 615,437

[22] Filed: May 30, 1984

[30] Foreign Application Priority Data

Jun. 9, 1983 [JP] Japan .................. 58-103666

[51] Int. Cl.³ .............. C25B 15/02; C25B 9/00; C25B 11/04
[52] U.S. Cl. .................. 204/229; 204/260; 204/271; 204/272; 204/290 R
[58] Field of Search .............. 204/228–229, 204/260, 271, 272, 290 R

[56] References Cited

U.S. PATENT DOCUMENTS

| 3,330,755 | 7/1967 | Mahany | 204/260 X |
| 3,936,364 | 2/1976 | Middle | 204/228 X |
| 4,119,520 | 10/1978 | Paschakarnis et al. | 204/271 X |
| 4,419,206 | 12/1983 | Frame | 204/271 X |
| 4,426,261 | 1/1984 | Fushihara | 204/260 X |

*Primary Examiner*—Donald R. Valentine
*Attorney, Agent, or Firm*—David A. Jackson; Daniel H. Bobis

[57] ABSTRACT

An electrolyzed water producing apparatus according to the invention is adapted to be directly connected to a faucet of a water service to continuously producing alkali ionic water and acid ionic water by electrolyzing operation and comprises an electronic control device including an automatic-manual operation changing circuit for changing the apparatus between automatic and manual operation modes, an electric current adjusting circuit for adjusting electrolytic current dependent upon variation in water quality, and a slow start circuit for automatically delaying the time when starting supply of the electrolytic current relative to the time when starting supply of water at a commencement of operation of said apparatus in the automatic operation mode.

2 Claims, 11 Drawing Figures

FIG. 7
FIG. 8
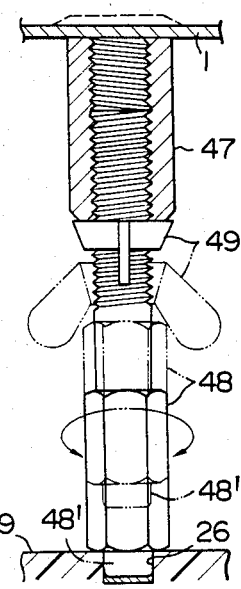
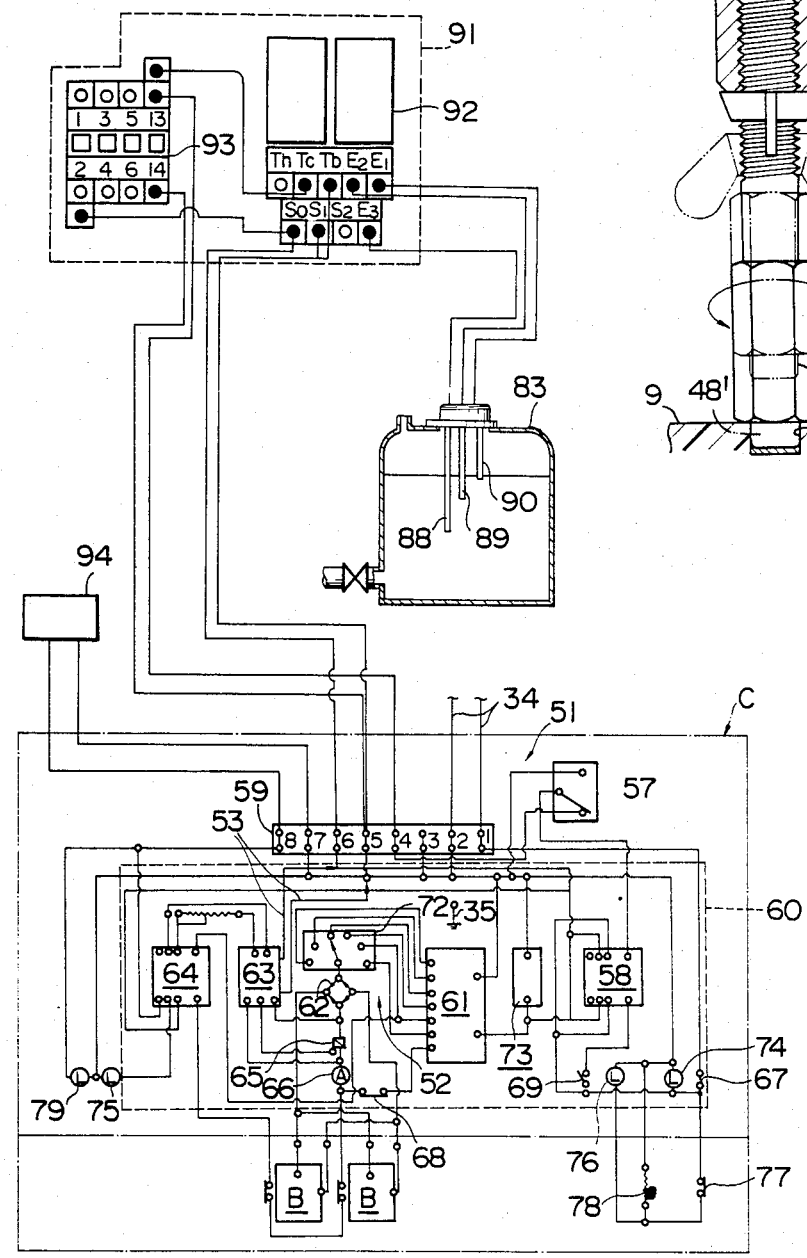

FIG. 10
FIG. 11
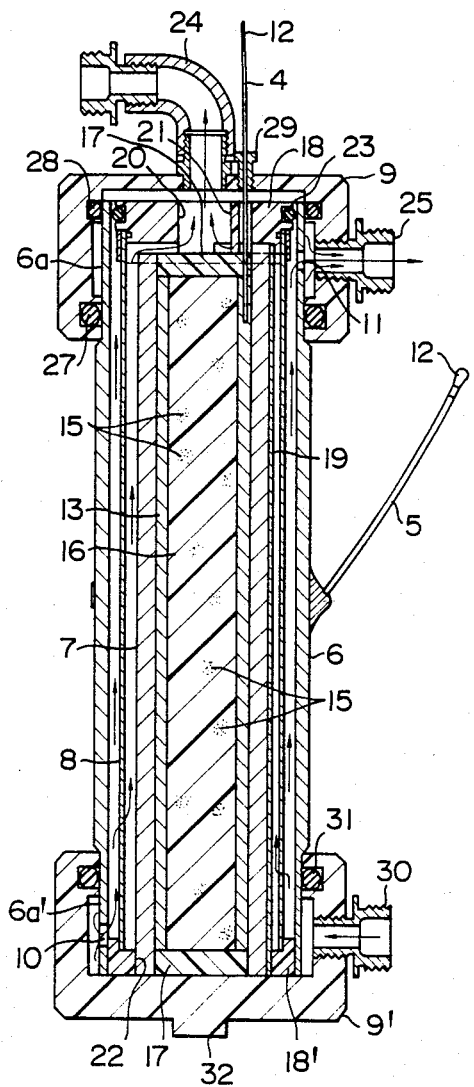
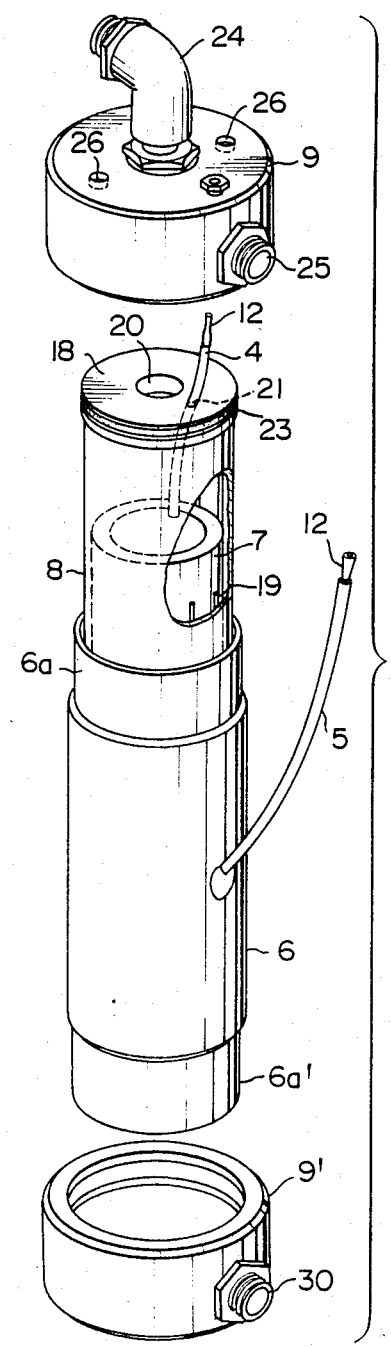

ELECTROLYZED WATER PRODUCING APPARATUS

BACKGROUND OF THE INVENTION

1. Field of the Invention

This invention relates to an electrolyzed water producing apparatus, and more particularly to an apparatus for producing alkali ionic water and acid ionic water in freely selectable automatic or manual operation mode.

2. Description of the Prior Art

Various kinds of electrolyzed water producing apparatus have been proposed for electrolyzing drinking water such as city water, underground water (well water) or the like into alkali ionic water and acid ionic water for industrial and business management purposes. All these apparatuses are of manually operated type, wherein operators always monitor the apparatuses and accumulated amounts of electrolyzed water to start and stop the supply of water and to turn on and off the apparatuses.

In the case of using the electrolyzed water, particularly alkali ionic water for manufacturing food, for example, bean curd, ham and the like, however, the above manually operated apparatuses for producing and storing the electrolyzed water do not answer that purpose and are not suitable for manufacturing food.

SUMMARY OF THE INVENTION

It is an object of the invention to provide an improved electrolyzed water producing apparatus capable of adjusting electrolytic current to ensure that electrolyzed water of PH 4–11 is always produced irrespective of variation in quality of water supplied to the apparatus.

It is another object of the invention to provide an electrolyzed water producing apparatus whose electric control system can be changed from automatic operation mode to manual operation mode and vice versa.

It is a further object of the invention to provide an electrolyzed water producing apparatus which mitigates starting or excess current caused at commencement of its operation in automatic operation mode to securely prevent any failure of electric system of the apparatus.

It is an additional object of the invention to provide an electrolyzed water producing apparatus durable in use for long years and having electrolytic cells particularly constructed to prevent any flowing of water into cylindrical anodes and any occurrence of cracks in circumferential walls of the anodes in spite of violent heating caused by the current passing through the anodes and cathodes.

These objects can be achieved by the electrolyzed water producing apparatus according to the invention, which is changeable between manual control mode for manually starting and stopping the operation of the apparatus and automatic control mode for automatically starting and stopping the electrolytic operation dependent on the storage and use of the electrolyzed water and which is able to securely produce the electrolyzed water of PH 4–11 irrespective of the water supplied to the apparatus.

Other features and advantages of the invention will be apparent from the following description taken in connection with the accompanying drawings. It is understood, however, that the drawings are for purpose of illustration only and are not intended as a definition of the limits of the invention.

BRIEF DESCRIPTION OF THE DRAWINGS

FIG. 7 illustrates the circuit under the automatic operation mode shown in FIG. 6;

FIG. 8 is an enlarged sectional view taken along the line VIII—VIII in FIG. 2;

FIG. 10 is a longitudinal sectional view of the electrolytic cell; and

FIG. 11 is a perspective view of the electrolytic cell under assembling or disassembling condition.

DETAILED DESCRIPTION OF THE PREFERRED EMBODIMENT

Figure 1:
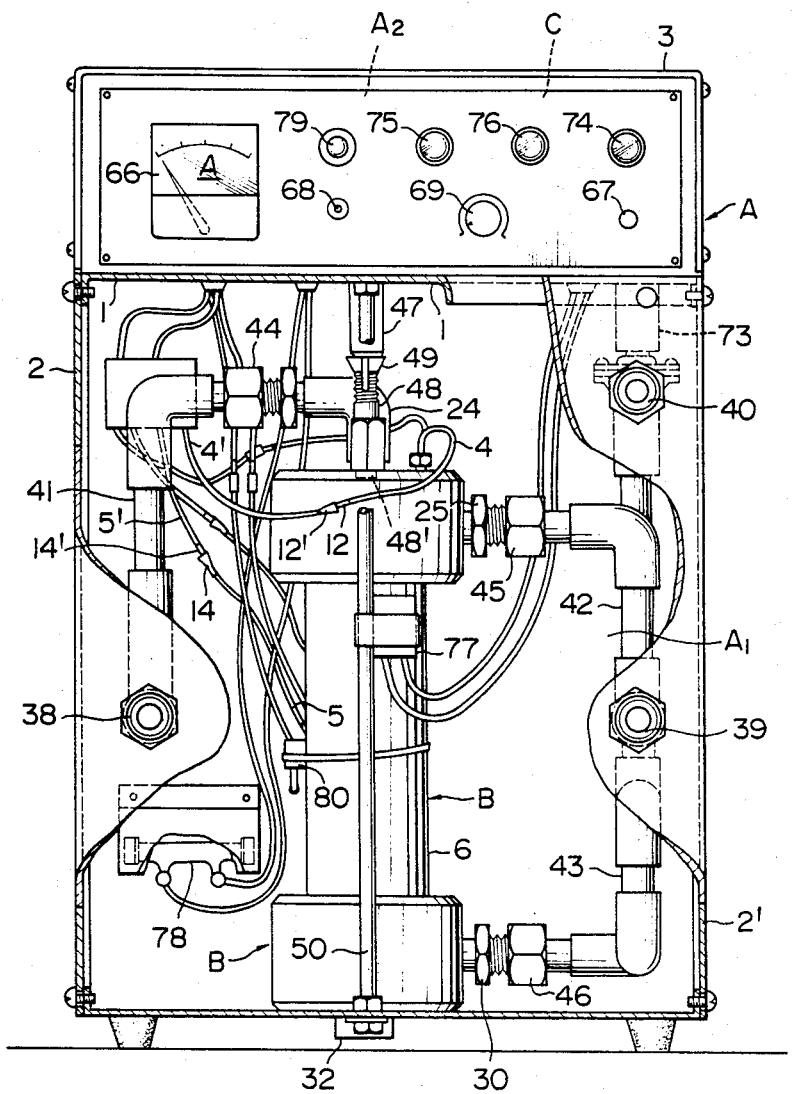
FIG. 1 is a front elevation illustrating the apparatus partially removed according to the invention.

As shown in the drawings, a main body of an electrolyzed water producing apparatus according to the invention consists of a casing (A), electrolytic cells (B) and an electric control device (C) respectively housed in the casing (A). The casing (A) is made of metal plates and in the form of a hexahedron which is vertically elongated rectangular in a front elevation and square in a plan view. The casing (A) is divided by a partition 1 into a housing chamber ($A_1$) for accommodating therein the electrolytic cells (B) and a built-in chamber ($A_2$) for receiving therein the electric control device (C).

The housing chamber ($A_1$) is arranged in the casing (A) on its lower inside and has a height such that the electrolytic cells (B) in vertical position are arranged in the housing chamber ($A_1$) and held thereat. The housing chamber ($A_1$) is opened in its both side faces, through which the electrolytic cells are get in and out of the housing chamber $A_1$. Side plates 2 and 2' are secured to the side faces of the housing chamber $A_1$ by means of set screws to close the openings thereof.

The built-in chamber ($A_2$) is arranged in the upper portion of the casing (A) divided by the partition 1 and opened in its upper and both sides faces so as to access electric equipment of the electric control device (C) built in the chamber ($A_2$) for repairing and exchanging the equipment of the electric control device (C) when it is out of order. A cover plate 3 is formed by bending a metal plate into an inverted U-shaped form and is detachably secured to the built-in chamber ($A_2$) by means of set screws to close the opened upper and side faces of the chamber ($A_2$).

Figure 2:
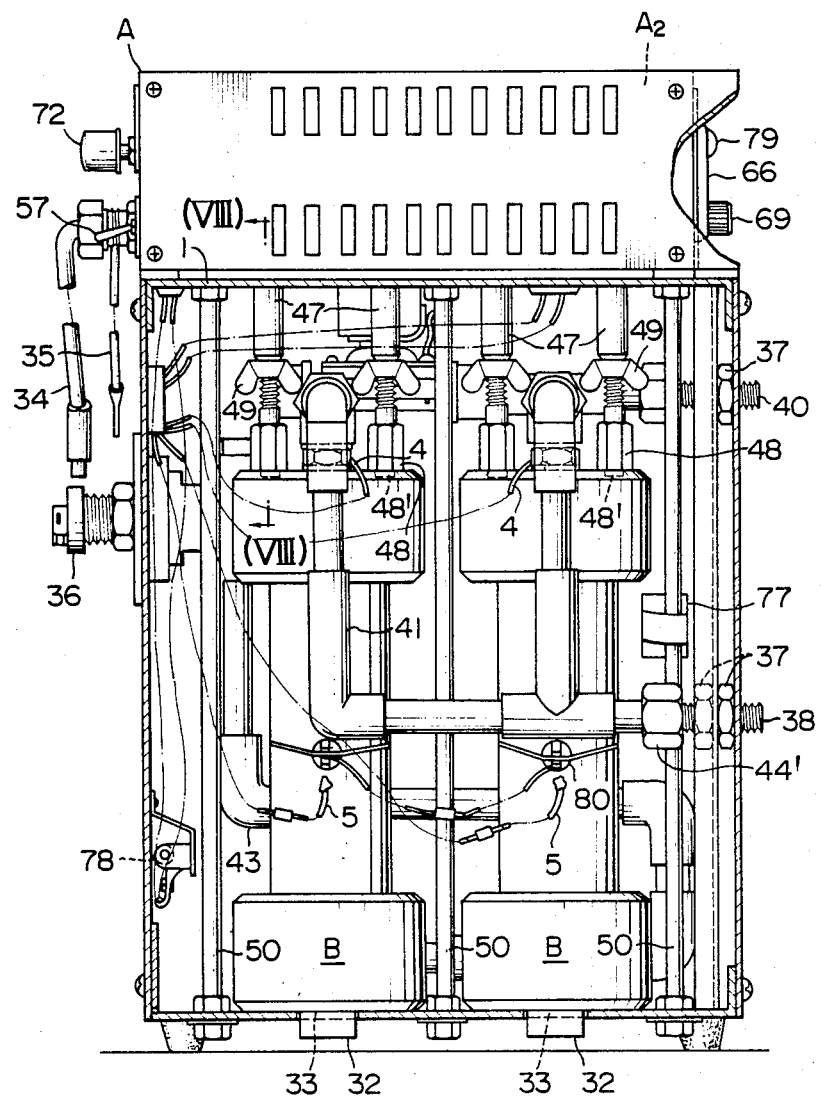
FIG. 2 is a side view of the apparatus on the left side as viewed in FIG. 1 illustrating a housing chamber in section.
Figure 3:
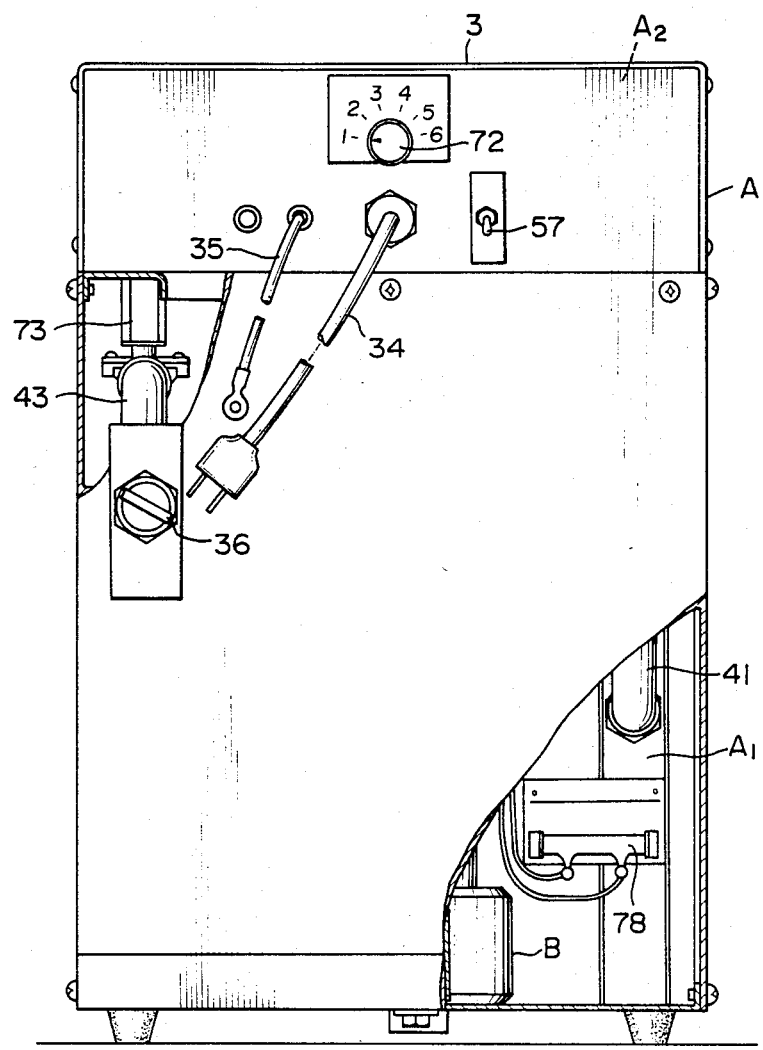
FIG. 3 is a back elevation, partially removed, of the apparatus shown in FIG. 1.
Figure 4:
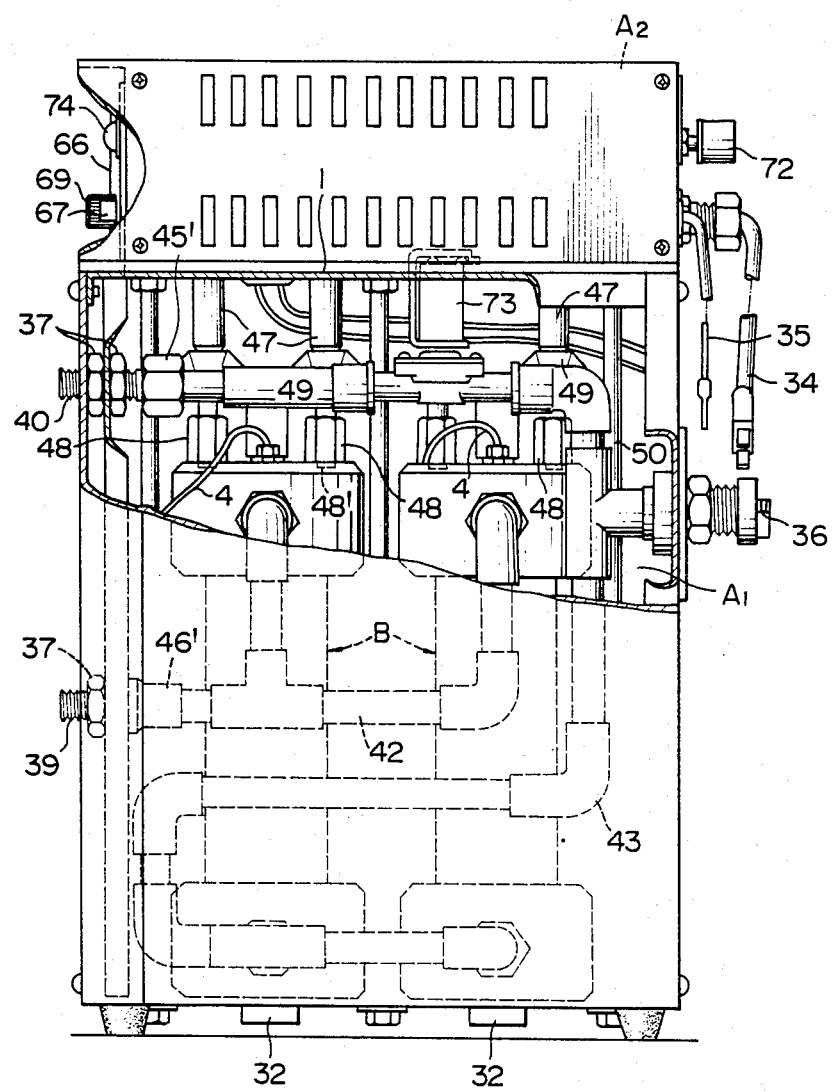
FIG. 4 is a side view of the apparatus on the right side as viewed in FIG. 1.
Figure 5:
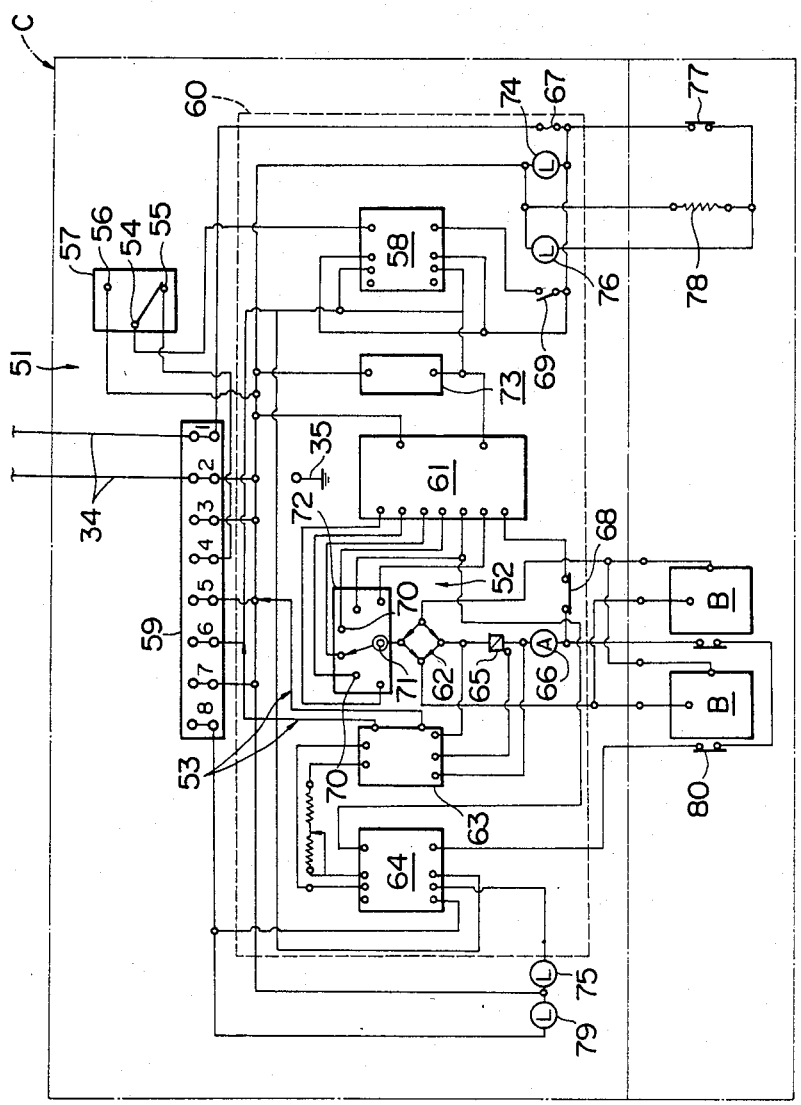
FIG. 5 illustrates a circuit of an electric control device of the apparatus according to the invention.

As shown in FIG. 2, moreover, the two electrolytic cells (B) are vertically arranged side by side in the housing chamber ($A_1$) and have lead wires 4 and 5 respectively electrically connected to plus and minus terminals of the cells for electrolyzing water supplied in the electrolytic cells (B) to produce alkali ionic water and acid ionic water.

Each of the electrolytic cells (B) consists of a cylindrical cathode 6, a cylindrical anode 7 arranged therein concentric thereto, a cylindrical membrane 8 concentrically therebetween, and a upper and a lower cap 9 and 9' detachably fitted on the upper and lower ends of the cathode 6.

As shown in FIGS. 10 and 11, the cylindrical cathode 6 is made of a hollow cylindrical stainless steel tube formed in its upper and lower cylindrical surface with reduced diameter fitting portions 6a and 6a'. The lower fitting portion 6a' is formed with a water inlet 10 at a suitable position in its circumferential wall. The upper fitting portion 6a is formed with an alkali ionic water outlet 11 in its circumferential wall at a location opposite to the water inlet 10. To an outer surface of the cathode 6 is connected an end of a minus lead wire 5 connected through a pair of connectors 12 and 12' to a minus lead wire 5' from the electric control device (C).

The cylindrical anode 7 is made of a hollow iron oxide provided on its inner surface with steel plating layer 13 (FIGS. 10 and 11). To the inside of the layer 13 is connected an end of a plus lead wire 4 connected through a pair of connectors 14 and 14' to a plus lead wire 4' from the electric control device (C).

Into the cylindrical anode 7 is poured a chipped foamed material 15 and filled paraffin resin material 16 so as to permit the foamed material to absorb the expansion of the paraffin material 16 due to heat, thereby preventing cracks in the outside of the cylindrical anode 7 which would otherwise occur. Epoxy resin discs 17 are arranged in upper and lower openings of the cylindrical anode 7 to prevent water from entering the anode 7.

The membrane 8 is made of a permeable material, for example, unwoven fabric, which is wound about a skeleton structure 19 suitably spaced apart from the anode 7 between upper and lower frame members 18 and 18' to form the cylindrical membrane 8. The upper frame member 18 is formed at its center with an outlet connecting opening 20 for the acid ionic water and in the proximity thereof with a leading aperture 21 for the lead wire 4 connected to the cylindrical anode 7. The lower frame member 18' is formed in its center with a fitting opening 22 within which is fitted a lower end of the anode 7 arranged in the membrane 8. An O-ring 23 is provided on the outside of the upper frame member 18 so as to be in close contact with the inner surface of the cylindrical cathode 6 to prevent the alkali and acid ionic waters from mixing with each other.

An upper and a lower cap 9 and 9' are made of a synthetic resin by molding and fitted on the upper and lower fitting portions 6a and 6a' of the cylindrical cathode 6 to cover the upper and lower ends thereof respectively. The upper cap 9 is provided at a center of its upper surface with an acid ionic water outlet tube 24 communicating with the outlet connecting opening 20 formed in the upper frame member 18 for the membrane 8, and at an outer circumferential wall with an alkali ionic water outlet tube 25 communicating with the alkali ionic water outlet 11 formed in the cylindrical cathode 6. The upper cap 9 is further formed in the upper surface with two latch recesses 26.

Moreover, O-rings 27 and 28 are provided on an inner surface of the upper cap 9 so as to be in close contact with the outer surface of the fitting portion 6a of the cylindrical cathode 6 to prevent the alkali and acid ionic water from mixing with each other and the alkali ionic water from leaking out therethrough. A fitting 29 is provided on the upper cap 9 for passing therethrough the lead wire 4 connected to the cylindrical anode 7.

A water supply tube 30 is threadedly fitted in the outer circumferential wall of the lower cap 9' so as to communicate with the water inlet 10 of the cylindrical cathode 6 through an inner annular groove of the cap 9' for introducing the water into the electrolytic cell (B). An O-ring 31 is located in the inside of the lower cap 9' so as to be in sealingly close contact with the outer surface of the fitting portion 6a' of the cylindrical cathode 6 for preventing the water flowing into the cap 9' through the water supply tube 30 from leaking out of the cap 9'. The lower cap 9' is formed on its lower surface with a latch protrusion 32 adapted to be fitted in a latch aperture 33 formed in a bottom plate in the housing chamber (A₁) so that the latch protrusion 32 and the latch aperture 33 form positioning means when the electrolytic cell (B) is located in the housing chamber (A₁) and the positioning means also serves to prevent the electrolytic cell from shifting from its proper position after installation. As shown in FIG. 2, the apparatus further comprises an electric source cord 34, an earth 35 and a cleaning water inlet 36 for cleaning the inside of the electrolytic cells (B).

With each electrolytic cell (B) in this embodiment, as above mentioned the cathode 6 and anode 7 are cylindrical and the membrane 8 is also formed in a cylindrical shape so as not to be deformed with the aid of the upper and lower frame members 18 and 18' and the skeleton structure 19 extending therebetween. Moreover, the O-rings 23, 27, 28 and 31 are arranged at the upper frame member 18 of the membrane 8 and the upper and lower caps 9 and 9' to prevent any mixture and leakage of the alkali and acid ionic waters, and the upper and lower caps 9 and 9' are adapted to be detachably fitted on the fitting portions 6a and 6a' of the cylindrical anode 6. In this manner, the electrolytic cell is easy and simple to assemble and disassemble (for cleaning) and there is no risk of water leakage (FIG. 11).

As shown in FIGS. 1 and 2, in the housing chamber (A₁) of the casing (A) are vertically accommodated and held the two electrolytic cells (B) each having the acid ionic water outlet tube 24, the alkali ionic water outlet tube 25 and the water supply tube 30 secured to the upper and lower caps 9 and 9'. These outlet tubes 24 and 25 and the supply tube 30 are connected through connecting pipes 41, 42 and 43 to respective fittings 38, 39 and 40 secured by lock nuts 37 to a front plate of the housing chamber (A₁) for the tubes 24, 25 and 30.

The connecting pipes 41, 42, and 43 are polyvinyl chloride pipes having respective open ends with union nuts 44, 44', 45, 45' 46 and 46' rotatably threadedly engaged therewith to connect the respective tubes 24, 25 and 30 and the fittings 38, 39 and 40.

In order to hold each electrolytic cell (B) housed in the housing chamber (A₁), the latch protrusion 32 provided on the lower cap 9' of the cell (B) is fitted in the latch aperture 33 of the bottom plate, and then into the latch recesses 26 of the upper cap 9 of the electrolytic cell (B) are fitted projections 48' of retainer bolts 48 vertically movably provided through support nuts 47 in the ceiling of the housing chamber (A₁) or the partition 1 between it and the built-in chamber (A₂) accommodating the electric control device (C). Thereafter, lock nuts 49 threadedly engaged on screwed shanks of the retained bolts 48 are tightened so as to lock the retainer bolts 48 against rotation to hold the electrolytic cell (B). Columns 50 are vertically secured between the bottom plate of the housing chamber $A_1$ and the partition 1 for preventing the upper caps 9 of the electrolytic cells (B) from moving in removal direction due to pressure caused by the water supplied in the electrolytic cells and for rigidly holding the entire apparatus.

Figure 9:
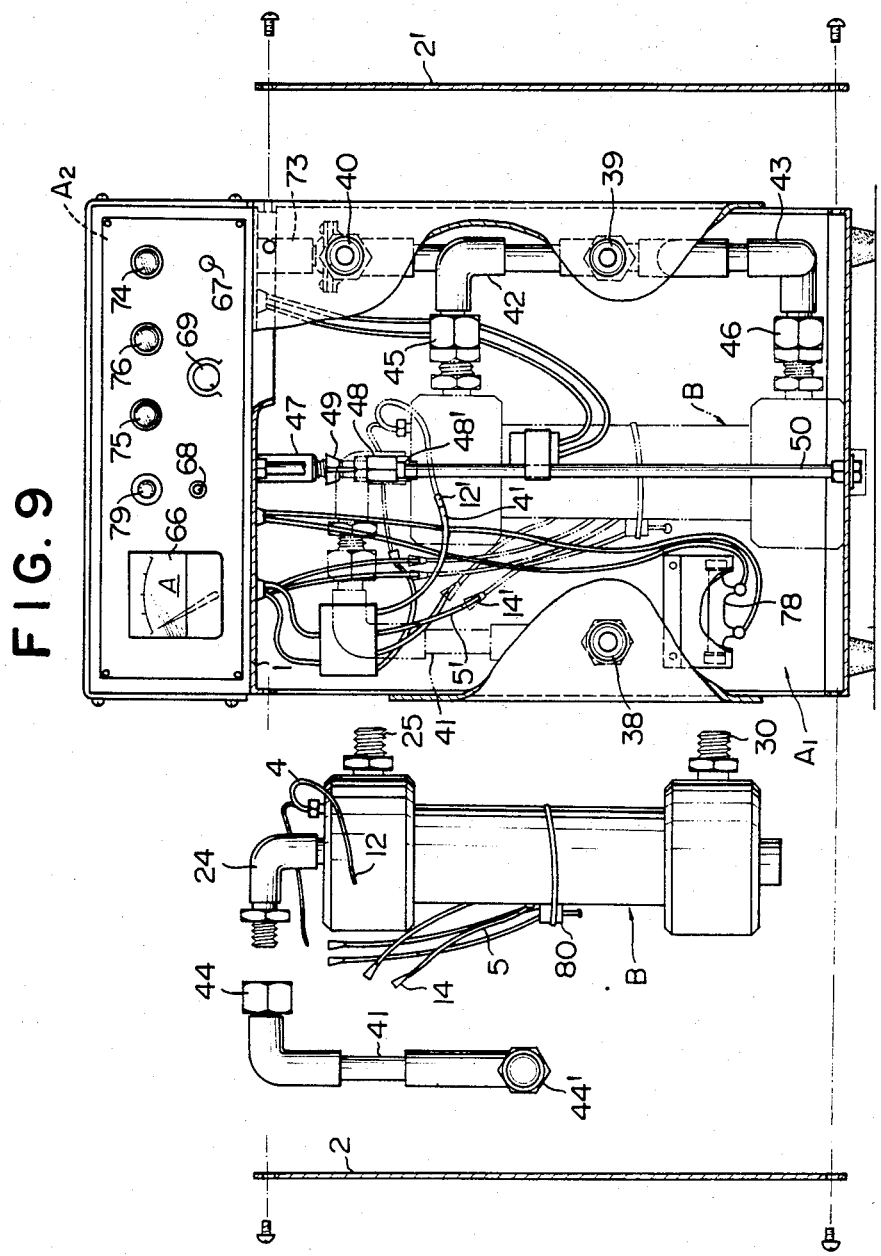
FIG. 9 is a front elevation of the apparatus partially removed after removal of electrolytic cells from the housing chamber.

In order to remove each electrolytic cell (B) housed in the housing chamber ($A_1$), after removal of the side plate 2 or 2' on either side face of the housing chamber ($A_1$) as shown in FIG. 9, the union nuts 45 and 46 for connecting the connecting pipes 42 and 43 to the alkali ionic water outlet tube 25 and the water supply tube 30 of the upper and lower caps 9 and 9' of the electrolytic cell (B) are removed from the tubes 25 and 30, respectively. Thereafter, the union nuts 44 and 44' for connecting the connecting pipe 41 to the acid ionic water outlet tube 24 and the fitting 38 for the tube 24 are removed from the housing chamber ($A_1$). After the lock nuts 49 are loosened, the retainer bolts 48 retaining the upper cap 9 of the cell (B) are rotated so as to be raised to remove the projections 28' from the latch recesses 26 of the upper cap 9 (as shown in phantom lines in FIG. 8). Under this condition the electrolytic cell (B) is raised and simply removed from the housing chamber ($A_1$).

The electric control device (C) comprises an automatic-manual operation changing circuit 51 for changing the apparatus between automatic and manual control modes, an electric current adjusting circuit 52 for adjusting the electrolytic current supplied to the electrolytic cells (B) depending upon variation in water quality, a slow start circuit 53 for automatically delaying the time when starting to supply the electrolyzing current in comparison with the time when starting to supply the water into the electrolytic cells, and other electrical equipment.

The automatic-manual operation changing circuit 51 comprises an automatic-manual changing switch 57 consisting of a change-over contact 54 connected to an AC 100 volt relay 58, an automatic contact 55 connected to a fourth terminal of a substrate plate 59 and a manual contact 56 connected to a main control circuit 60 including required various equipment, for changing the electrolyzed water producing apparatus into automatic or manual operation mode. Moreover, the main circuit 60 comprises a transformer 61, a rectifier 62, a printed circuit board 63 connecting a rectifier diode, a switching diode, a metal oxide resistor, a carbon resistor, a pulse, transformer, a transistor, a zener diode, a semi-fixed volume, an oil condenser, a film condenser, an electrolytic condenser and the like, an AC 24 volt relay 64, the AC 100 volt relay 58, a triode AC switch 65, an ammeter 66, a fuse 67, a breaker 68, a VR switch 69 including an ON and OFF function in the manual mode, and the like.

The electric current adjusting circuit 52 includes an electric current adjuster 72 having a plurality of (six in the illustrated embodiment) adjusting contacts 70 each connected to a terminal of the transformer 61 and a change-over contact 71 connected to the rectifier 62, thereby adjusting the electrolytic current to be applied to the electrolytic cells (B) (setting the range of effective current for the initial period) depending upon the variation in water quality (kinds of water easy and difficult to flow the current therethrough and the like) so as to obtain high quality alkali ionic water (PH 4-11) with ease.

The slow start circuit (time lag start circuit) 53 is constructed to connect the printed circuit board 63 in the main control circuit 60 to fifth and sixth terminals of the substrate plate 59. The slow start circuit 53 prevents failure of the fuse 67, the breaker 68 and the like when the apparatus is again started after it has completed one cycle of the electrolyzing operation. In the automatic operation mode, when the apparatus is again started, the water supply and current supply may be simultaneously started to flow starting or excess current which may give rise to failure of the equipment. In more detail, when one operation cycle has been completed, there is electrolyzed water of the previous cycle remaining in each electrolytic cell (B), as the result of which when the apparatus is again started, the excess current flows to open the breaker or the fuse. In order to prevent this, the slow start circuit 53 serves to delay the supply of the electrolytic current behind the start of the supply of the water into the electrolytic cells (B) to prevent the overcurrent. A solenoid valve 73 is mounted on a connecting pipe 43 for connecting the water supply tube 30 provided in the lower cap 9' of each the electrolytic cell B to the fitting 40 secured to the front plate of the housing chamber ($A_1$). The solenoid valve 73 is actuated to flow the water into the electrolytic cell (B) at the same time when the apparatus is started, and to stop the flow of the water when the apparatus is stopped.

A power supply lamp 74 is provided to be lighted when the power source cord 34 is connected to an AC 100 volt plug socket. An electrolytic current lamp 75 is lighted when the VR switch 69 is turned on to indicate that the electrolytic current flows through the electrolytic cell (B). A temperature indication lamp 76 is lighted while a heater 78 is energized in the event that the temperature in the housing chamber ($A_1$) accommodating therein the electrolytic cells (B) falls to a temperature lower than 5° C. which is sensed by a thermoswitch 77 provided in the housing chamber ($A_1$). The lamp 76 is turned off when the heater is deenergized at the temperature 15° C. An alarm lamp 79 is lighted by a thermostat switch 80 mounted on the electrolytic cell (B) which detects a temperature higher than 43° in the cell (B) caused by excess electrolytic current (more than 8 amperes) in the cell (B) or flowing of the electrolytic current in spite of no water in the cell (B).

Figure 6:
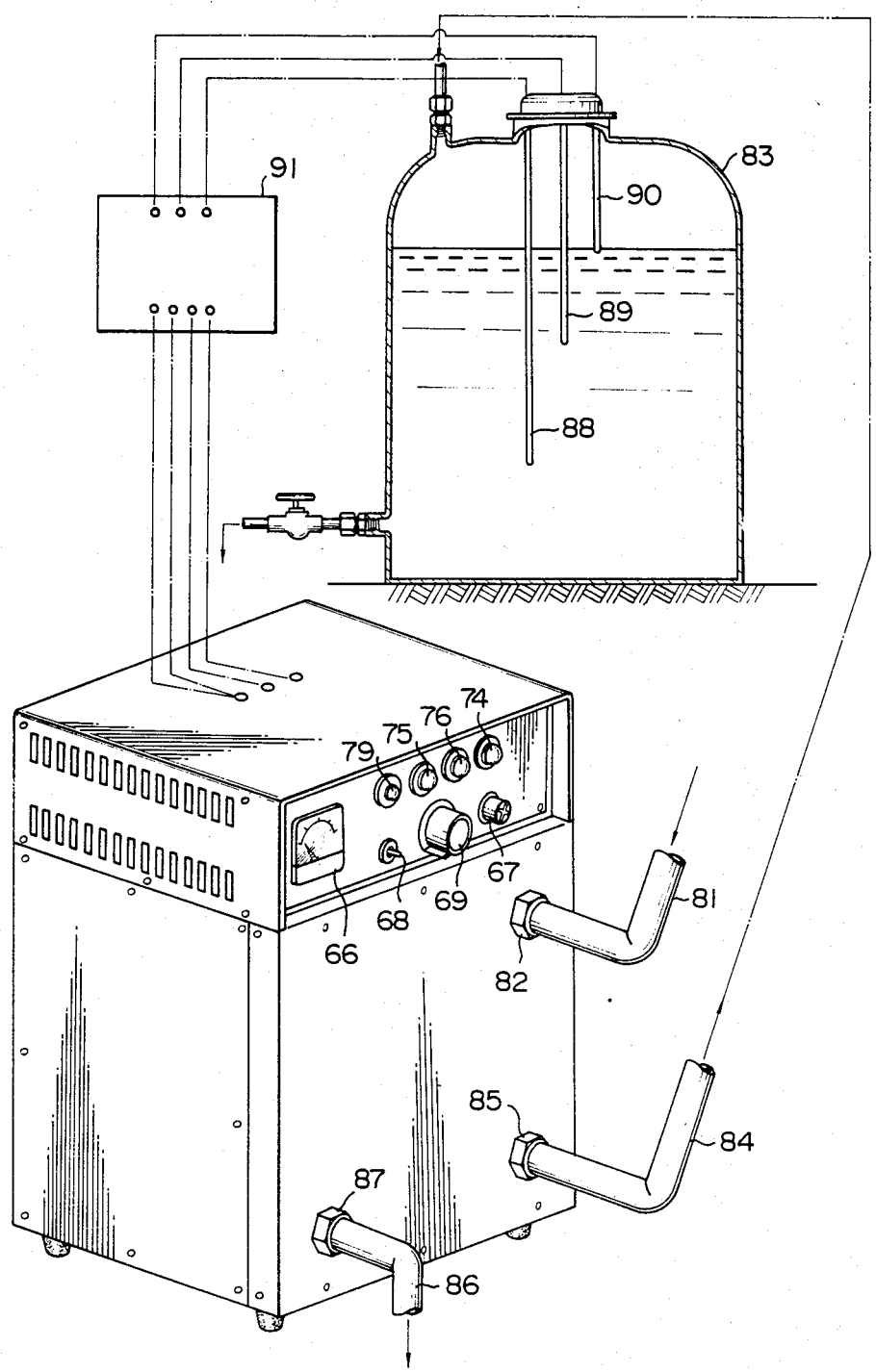
FIG. 6 is a perspective view illustrating a using condition of the apparatus according to the invention in automatic operation mode.

The operation and using method of the apparatus according to the invention will be explained hereinafter. In the case of the automatic operation mode, to the water supply tube fitting 40 extending from the front plate of the apparatus is first connected through a union nut 82 a front end of a water supply connecting pipe 81 which is connected through a branch pipe to a faucet of a water service as shown in FIGS. 6 and 7. To the fitting 39 for the alkali ionic water outlet tube 25 is connected through a union nut 85 an alkali ionic water connecting pipe 84 which is connected to an alkali ionic water reservoir 83 for storing the electrolyzed alkali ionic water, and to the fitting 38 for the acid ionic water outlet tube 24 is connected through a union nut 87 an acid ionic water connecting pipe 86. As shown in FIG. 7, the reservoir 83 is provided therein with three depending electrodes 88, 89 and 90 respectively connected to terminals $E_1$, $E_2$ and $E_3$ of a flootless switch 92 in a control board 91. Terminals $S_0$, $S_1$ and $T_c$ of the switch 92 are connected to the fifth and sixth terminals of the substrate plate 59 in the electric control device (C) of the apparatus. The fifth and sixth terminals are supplied with electric current from the AC 100 V source for the control board 91.

Moreover, the control board 91 includes a magnet switch 93 whose 13th and 14th terminals are connected to the fifth and sixth terminals of the substrate plate 59 in the electric control device (C), so that the automatic-manual changing switch 57 is changed onto the automatic operation side to bring the apparatus into the automatic operation mode. The VR switch 69 is turned on and a knob of the electric current adjuster 72 is rotated to set a rough range of current dependent upon the water quality, while the VR switch 69 is rotated referring to a pointer of the ammeter 66 to finely adjust the electric current. When the alkali ionic water in the reservoir 83 decreases to the lower end of the electrode 88, the apparatus starts its operation. In this moment, the slow start circuit 53 causes the solenoid valve 73 to open to start the water supply into the electrolytic cells (B) prior to the supply of current. After lapse of time 2-4 seconds therefrom, the electrolytic current is supplied to start the electrolyzing of the water, thereby feeding alkali ionic water into the reservoir 83. When the alkali ionic water fed into the reservoir 83 rises to the lower end of the electrode 90, the apparatus is stopped. In the manner as above described, the alkali ionic water progressively decreases in the reservoir and then the apparatus again starts its operation so as to produce the alkali ionic water. In the case that the apparatus operates in the automatic operation mode, an alarm buzzer 94 is preferably connected to the 7th and 8th terminals of the substrate plate 59 in the electric control device (C), so that any trouble in the apparatus can be rapidly detected from a remote plate to prevent failure of the apparatus.

In the case that the apparatus operates in the manual operation mode, on the other hand, a faucet of a water service is connected to the fitting 39 for the alkali ionic water outlet tube or the fitting 38 for the acid ionic water tube and the automatic-manual changing switch 57 in changed onto its manual operation side to operate the apparatus in the manual operation mode. In this mode, a rough range of current is set by the electric current adjuster 72 dependent upon the water quality but finely adjust by the VR switch 69 by which the power source is turned on and off in the same manner as in the automatic operation mode.

It is further understood by those skilled in the art that the foregoing description is that of preferred embodiment of the disclosed apparatus and that various changes and modifications may be made in the invention without departing from the spirit and scope thereof.

What is claimed is:

1. An electrolyzed water producing apparatus comprising a casing; at least one electrolytic cell arranged in said casing comprising a cylindrical cathode and a cylindrical anode arranged concentrically to each other, a partition arranged between said cathode and said anode, and upper and lower caps respectively secured to upper and lower open ends of said cathode and said anode; and an electric control device, arranged in said casing comprising an automatic-manual operation changing circuit for changing said apparatus between automatic and manual operating modes, an electric current adjusting circuit for adjusting electrolytic current dependent upon variation in water quality, and a slow start circuit for delaying the supply of electrolytic current to said at least one electrolytic cell until after water has been supplied to said at least one electrolytic cell when commencing the electrolyzing operation of said apparatus in the automatic operating mode thereof.

2. An electrolyzed water producing apparatus as set forth in claim 1, wherein said cylindrical anode is in the form of a hollow cylinder provided on its inner circumferential surface with a steel plating layer and filled therein with chipped foamed material and synthetic resin material, and upper and lower ends of said hollow cylinder are covered by members made of a material which is heat-resistant and high viscous and superior in adherence and has a small thermal expansion coefficient.

* * * * *